(12) United States Patent
Yamaki et al.

(10) Patent No.: US 6,933,838 B2
(45) Date of Patent: Aug. 23, 2005

(54) INFORMING SOUND GENERATION METHOD AND APPARATUS FOR VEHICLE

(75) Inventors: Kiyoshi Yamaki, Hamamatsu (JP); Motoaki Miyabe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 92 days.

(21) Appl. No.: 10/454,129

(22) Filed: Jun. 3, 2003

(65) Prior Publication Data

US 2003/0227376 A1 Dec. 11, 2003

(30) Foreign Application Priority Data

Jun. 6, 2002 (JP) ........................................ 2002-165274

(51) Int. Cl.[7] ............................. B60Q 1/00; B60Q 1/34; B60Q 1/40; G08G 3/00
(52) U.S. Cl. ................. 340/475; 340/425.5; 340/384.1; 340/441; 340/457; 340/465; 340/477; 340/478
(58) Field of Search ............................. 340/425.5, 692, 340/463–478, 441, 457, 384.1

(56) References Cited

U.S. PATENT DOCUMENTS 4,065,767 A * 12/1977 Neuhof et al. ........... 340/384.4
5,646,590 A * 7/1997 Dembicks .................... 340/475
6,154,125 A * 11/2000 McAuley et al. ........... 340/465
6,426,695 B2 * 7/2002 Pagano et al. ............... 340/475

FOREIGN PATENT DOCUMENTS

JP  2000-272414  10/2000

* cited by examiner

Primary Examiner—Jeffery Hofsass
Assistant Examiner—Lam Pham
(74) Attorney, Agent, or Firm—Morrison & Foerster LLP

(57) ABSTRACT

Detection is made of an activated direction of a vehicular operator device capable of being activated in at least two directions. In response to activation, in a first direction, of the operator device, informing sound is generated which varies over time with a first characteristic, and, in response to activation, in a second direction, of the operator device, informing sound is generated which varies over time with a second characteristic generally opposite to the first characteristic. For example, when a right turn is instructed, informing sound is generated with a characteristic to progressively raise the sound pitch from a relatively low sound pitch, while when a left turn is instructed, informing sound is generated with a characteristic to progressively lower the sound pitch from a relatively low sound pitch (, or vice versa).

15 Claims, 5 Drawing Sheets

INFORMING SOUND GENERATION METHOD AND APPARATUS FOR VEHICLE

BACKGROUND OF THE INVENTION

The present invention relates to informing sound generation methods, apparatus and computer programs for generating sound to auditorily inform activation of vehicular operator devices that can be activated in at least two directions or symmetrically opposite directions.

Heretofore, it has been conventional for vehicles, such as motor vehicles and motor cycles, to generate informing sound that informs activation of a direction indicator (i.e., blinker or winker), such as ticktack operating sound of a winker relay, or voice announcement, such as "the vehicle is turning right" or "the vehicle turning left".

However, although the relay operating sound can inform the vehicle driver that the direction indicator is now in operation, they are unable to inform pedestrians and/or the like near the vehicle whether the vehicle is turning right or turning left. Further, although the voice announcement can inform pedestrians and/or the like that the vehicle is turning right or left, it may become annoying noise in some cases or tends to be useless in cases where announced words are hard to recognize due to ambient noise etc. Furthermore, pedestrians and/or the like near the vehicle have to listen more or less carefully to the voices to understand the meaning of the voice announcement. Thus, with the conventional techniques, it has been difficult to inform vehicle's behavior in such a manner that pedestrians and/or the like near the vehicle can readily recognize the vehicle's behavior, practically through intuition, with no misunderstanding.

SUMMARY OF THE INVENTION

In view of the foregoing, it is an object of the present invention to provide an improved informing sound generation method, apparatus and computer program which can generate sound for informing a vehicle driver's intention and/or a traveling direction of a vehicle in such a manner as that a pedestrian and/or the like can readily recognize, practically through intuition, the driver's intention and/or traveling direction.

In order to accomplish the above-mentioned object, the present invention provides an informing sound generation method for generating informing sound in response to activation of a vehicular operator device capable of being activated in at least two directions, which comprises: a step of, in response to activation, in a first direction, of the operator device, generating informing sound varying over time with a first characteristic; and a step of, in response to activation, in a second direction, of the operator device, generating informing sound varying over time with a second characteristic generally opposite to the first characteristic.

Preferably, the first characteristic and the second characteristic are different in symmetrical relation to each other. As an example, any one of or a combination of any two or more of a sound pitch, color and length of the informing sound varies over time. For example, the operator device is any one of a direction indicating operator, steering wheel, accelerator pedal, brake pedal and speed change lever of a vehicle. The two directions, in which the operator device can be activated, are first and second directions opposite to each other, such as clockwise and counterclockwise directions in the case where the operator device is the direction indicating operator or steering wheel, depressing and releasing directions in the case where the operator device is the accelerator, brake, clutch or other type of pedal, and upshift and downshift directions in the case where the operator device is the speed change lever. In this specification, activation or operation in such opposite directions is also referred "symmetrical activation or operation".

Namely, according to the present invention, the time-varying characteristic of the informing sound is varied in generally opposite directions, preferably in a symmetrical fashion, in response to different activated directions of the operator device, so that a driver's intention and/or traveling direction can be informed in such a manner that pedestrians and/or the like near the vehicle can readily recognize the meaning of the sound practically through intuition. Therefore, even the middle of busy streets full of noise, the meaning of such informing sound, differing from each other generally oppositely (preferably symmetrically) in accordance with different activated directions of the operator device, are very easy to auditorily recognize. For example, when a right turn is indicated via the direction indicating operator, there is generated informing sound with a characteristic to progressively raise the pitch of the sound from a relatively low pitch, while when a left turn is indicated via the direction indicating operator, there is generated informing sound with a characteristic to progressively lower the pitch of the sound from a relatively high pitch (, or vice versa). In this way, a pedestrian and/or the like near the vehicle can readily recognize the difference between the time-varying characteristics of the generated informing sound to thereby know a turning direction of the vehicle.

The present invention may be constructed and implemented not only as the method invention as discussed above but also as an apparatus invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENTS

Figure 1:
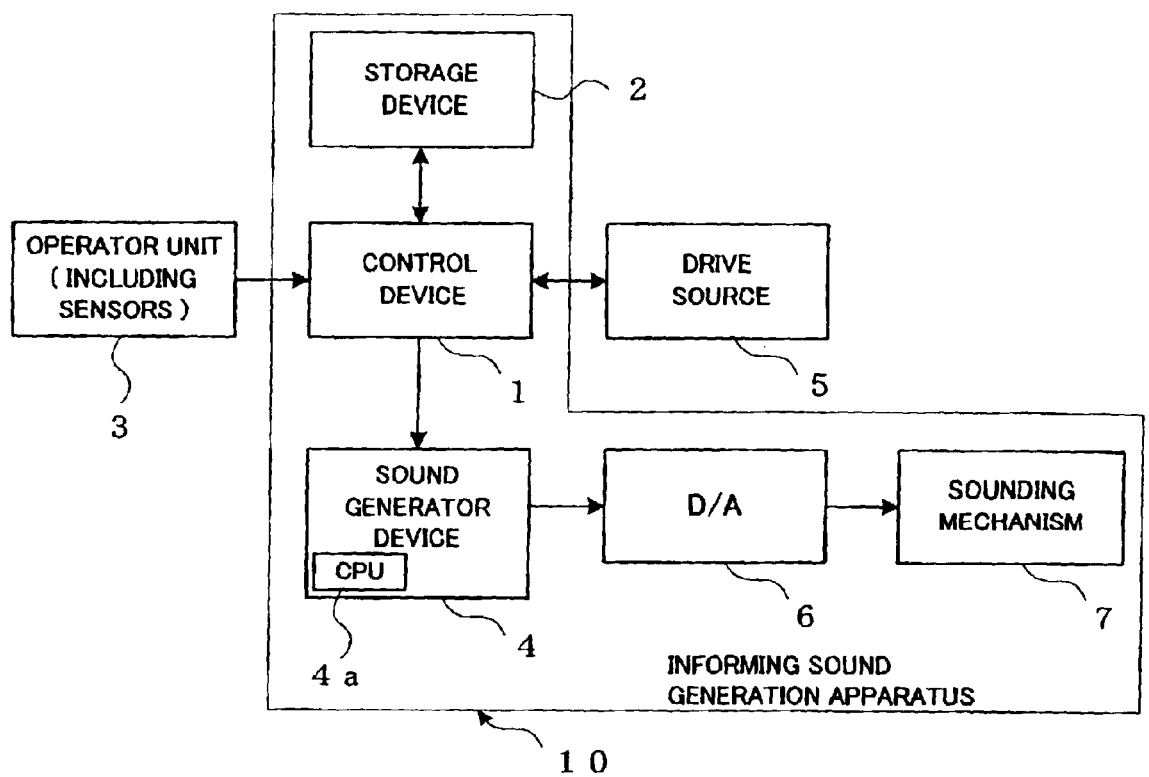
FIG. 1 is a block diagram showing a general hardware setup of a vehicle system employing an informing sound generation apparatus that embodies an informing sound generation method of the present invention.

In FIG. 1, there is shown a general hardware setup of a vehicle system employing an informing sound generation apparatus that performs an informing sound generation method of the present invention.

Figure 2:
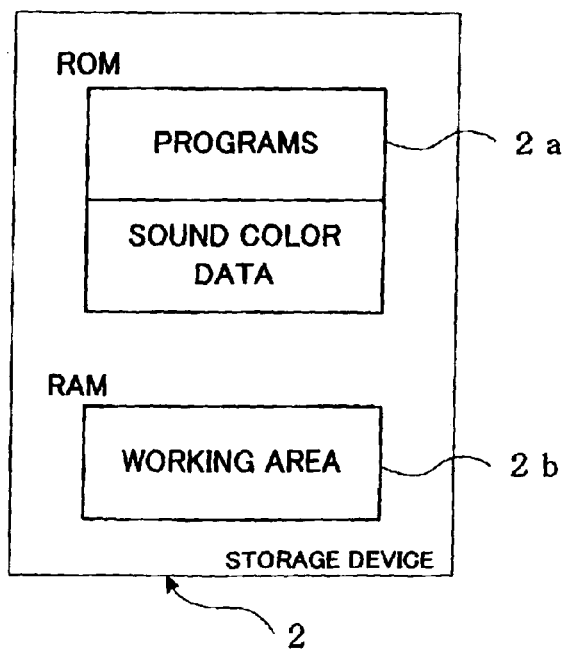
FIG. 2 is a diagram showing a storage device employed in the informing sound generation apparatus.

In the vehicle system of FIG. 1, a control device 1 of the informing sound generation apparatus 10 includes a CPU (Central Processing Unit), which controls a drive source 5, such as an electric motor, by executing a drive source control program and controls a sound generator device 4 by executing an informing sound generation program of the present invention on the basis of activated direction information supplied from an operator unit 3. As shown in FIG. 2, a storage section 2 of the apparatus 10 includes a ROM (Read-Only Memory) 2a storing various programs, such as the drive source control program and informing sound generation program, to be executed by the control device 1, a plurality of preset sound color data sets and sound color combination pattern data sets for generating informing sound, etc., and a RAM (Random Access Memory) 2b having a working area for use by the control device 1 and the like.

The operator unit 3 includes various vehicle-mounted switches and other operators which can be activated by a human driver or user of the vehicle in opposite or symmetrical directions and are capable of detecting their activated directions, such as a winker (blinker) switch (i.e., direction indicating operator), switch for detecting a rotated direction of a steering wheel and pedal switches like an accelerator pedal. The sound generator device 4, which includes a PCM sound generator and/or FM sound generator provided with a CPU 4a, generates informing sound on the basis of sound generator parameters supplied from the control device 1. D/A converter 6 converts informing sound data, generated by the sound generator device 4, into analog informing sound signals and supplies the thus-converted analog informing sound signals to a sounding mechanism 7 including, for example, a speaker containing an amplifier. The sounding mechanism 7 audibly reproduces or sounds each of the supplied analog informing sound signals through the speaker. The drive source 5 is an electric motor or internal combustion engine for driving the vehicle. In the case where the drive source 5 is an electric motor, the control device 1 controls the driving force of the motor by controlling a motor drive current to be supplied to the motor, while in the case where the drive source 5 is an internal combustion engine, the control device 1 controls the driving force of the engine by performing ignition timing control and/or fuel jet control.

Next, a description will be given about informing-sound generation control processing carried out by the control device 1 in the informing sound generation apparatus 10, with reference to a main control flow chart of FIG. 3. The flow chart of FIG. 3 shows an example step sequence of the informing-sound generation control processing carried out when the vehicle is instructed to turn right or left.

Figure 3:
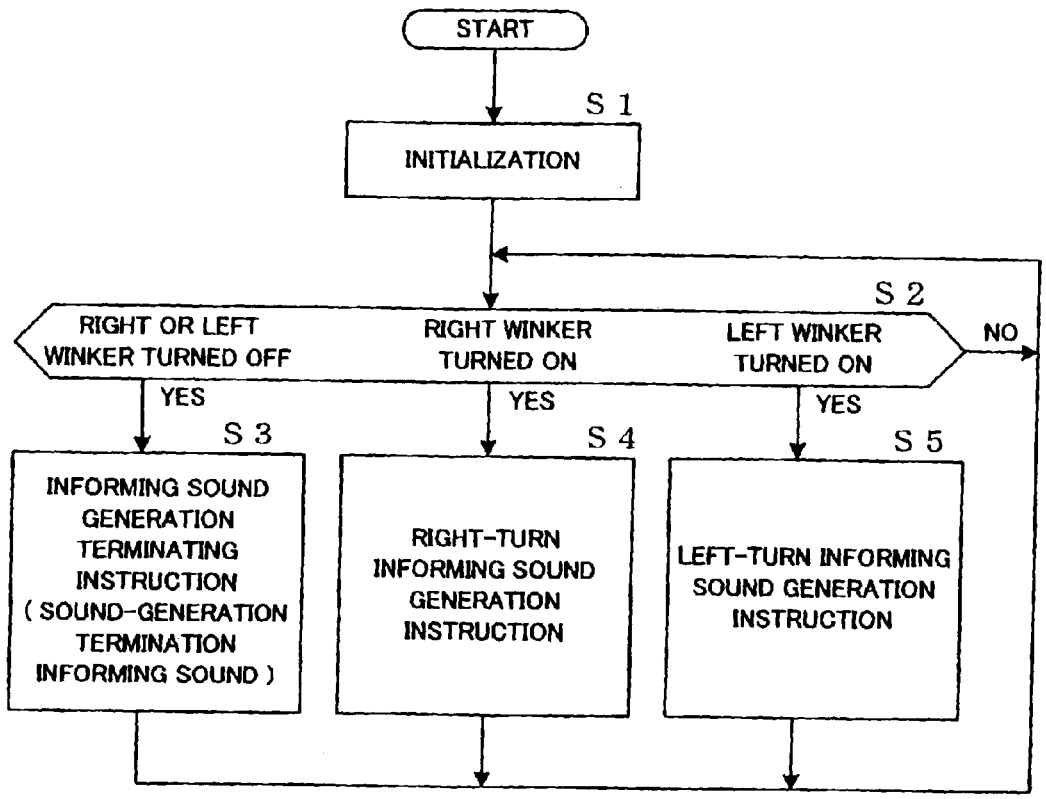
FIG. 3 is a flow chart showing a main flow of informing-sound generation control processing carried out by a control device of the informing sound generation apparatus.

The main control flow of FIG. 3 is started up in response to turning on of the main switch of the vehicle. At step S1, the working area provided in the RAM 2b of the storage section 2 is initialized and a sound generation flag is initialized. Then, at next step S2, a determination is made as to whether the right or left winker has been deactivated, the right winker has been activated or the left winker has been activated. Namely, at step S2, the control device 1 detects a current operational state or position of the winker switch included in the operator unit 3. In this case, it is determined that the right or left winker has been deactivated or turned off when the winker switch is returned to the OFF position after having been shifted to the right or left winker actuating position.

If the right winker has been activated (turned on), i.e. if the winker switch has been switched to the right winker actuating (i.e., right winker ON) position, as determined at step S2, the control device 1 proceeds to step S4, where an instruction for generating sound to inform a right turn of the vehicle (right-turn informing sound generation instruction) is given to the sound generator device 4. Thus, the sound generator device 4 repeatedly generates a series of right-turn informing sound until the right turn of the vehicle is terminated. If the left winker has been activated, i.e. if the winker switch has been switched to the left winker actuating (i.e., left winker OFF) position, as determined at step S2, the control device 1 proceeds to step S5, where an instruction for generating sound to inform a left turn of the vehicle (left-turn informing sound generation instruction) is given to the sound generator device 4. Thus, the sound generator device 4 repeatedly generates a series of left-turn informing sound until the left turn of the vehicle is terminated. Further, if the right or left winker has been deactivated (turned off), i.e. if the winker switch has been switched back to the OFF position from the right or left winker actuating position, as determined at step S2, the control device 1 proceeds to step S3, where an instruction for silencing the right-turn or left-turn informing sound having been generated so far (right- or left-turn informing sound generation terminating instruction) is given to the sound generator device 4. Thus, the sound generator device 4 carries out a damping process on the so-far-generated informing sound to deaden the informing sound and generate winker-deactivation (or sound-generation termination) informing sound only once. Furthermore, if it is determined at step S2 that the winker switch is kept in the OFF position as before, a negative (NO) determination is made at step S2, and the control device 1 repeats the operation of step S2. Upon completion of the operation at step S3, S4 or S5, the control device 1 reverts to step S2 to repeat the operation of step S2.

Figure 4:
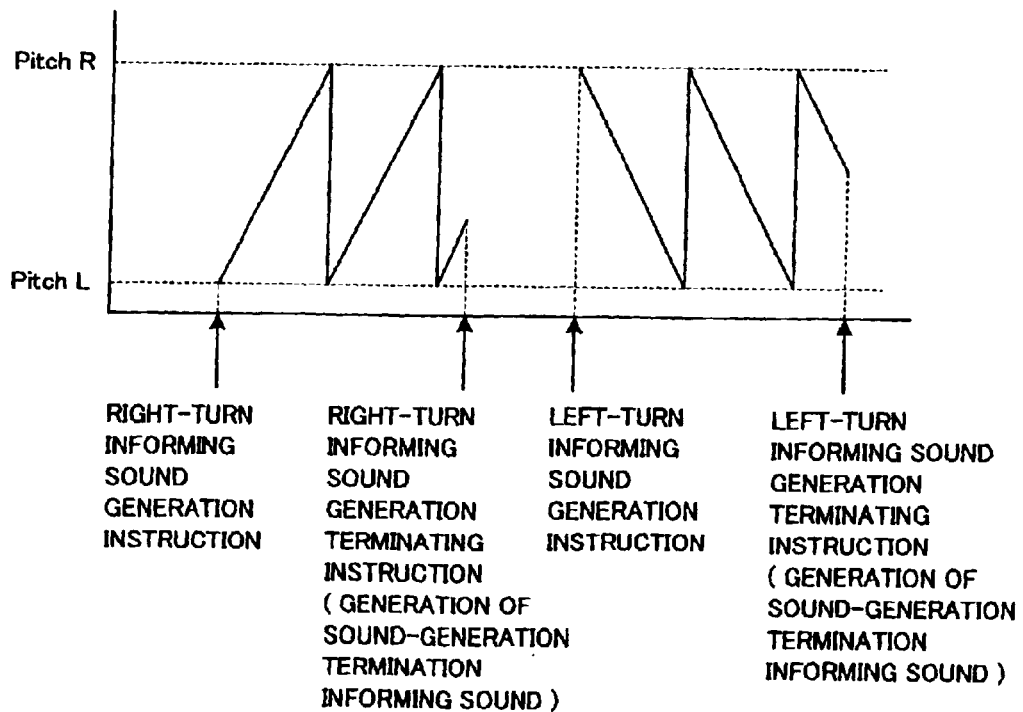
FIG. 4 is a diagram showing an example manner in which informing sound is generated by the informing sound generation apparatus.

The following paragraphs describe the right-turn informing sound and left-turn informing sound generated by the sound generator device 4 in response to the right-turn informing sound generation instruction and left-turn informing sound generation instruction given by the control device 1, with reference to FIG. 4.

In the instant embodiment, lowest and highest pitches PitchL and PitchR of the right-turn and left-turn informing sound are determined previously. For the right-turn informing sound, the lowest pitch PitchL is set as a start pitch and the highest pitch PitchR is set as a target pitch, while, for the left-turn informing sound, the highest pitch PitchR is set as a start pitch and the lowest pitch PitchL is set as a target pitch. Therefore, once the right-turn informing sound generation instruction is given, the sound generator device 4 generates informing sound that starts with the lowest pitch PitchL and progressively rises in pitch toward the highest or target pitch PitchR, as illustrated in FIG. 4. Thus, pedestrians and/or the like hearing the informing sound generated with the progressively rising pitch can know, practically through intuition, that the vehicle is turning right; this is because various musical instruments, most typically pianos, are constructed to generate tones with a pitch rising as their performance operators, such as keys, are operated in a left-to-right direction.

Similarly, once the left-turn informing sound generation instruction is given, the sound generator device 4 generates informing sound that starts with the highest pitch PitchR and progressively lowers in pitch toward the lowest or target pitch PitchL, as illustrated in FIG. 4. Thus, pedestrians and/or the like hearing the informing sound generated with the progressively lowering pitch can know, practically through intuition, that the vehicle is turning left. Namely, the informing sound generation apparatus 10 of the present invention is arranged to generate informing sound such that the right-turn informing sound and the left-turn informing sound varies in pitch in symmetrical relation to each other.

Note that each of the series of right-turn informing sound and the left-turn informing sound is generated repeatedly until a right- or left-turn informing sound generation terminating instruction is given from the control device 1 as illustrated in FIG. 4. In response to the sound generation terminating instruction from the control device 1, the informing-sound damping process is carried out to silence or deaden the informing sound having been generated so far, and simultaneously, sound-generation termination informing sound is generated only once.

Figure 5:
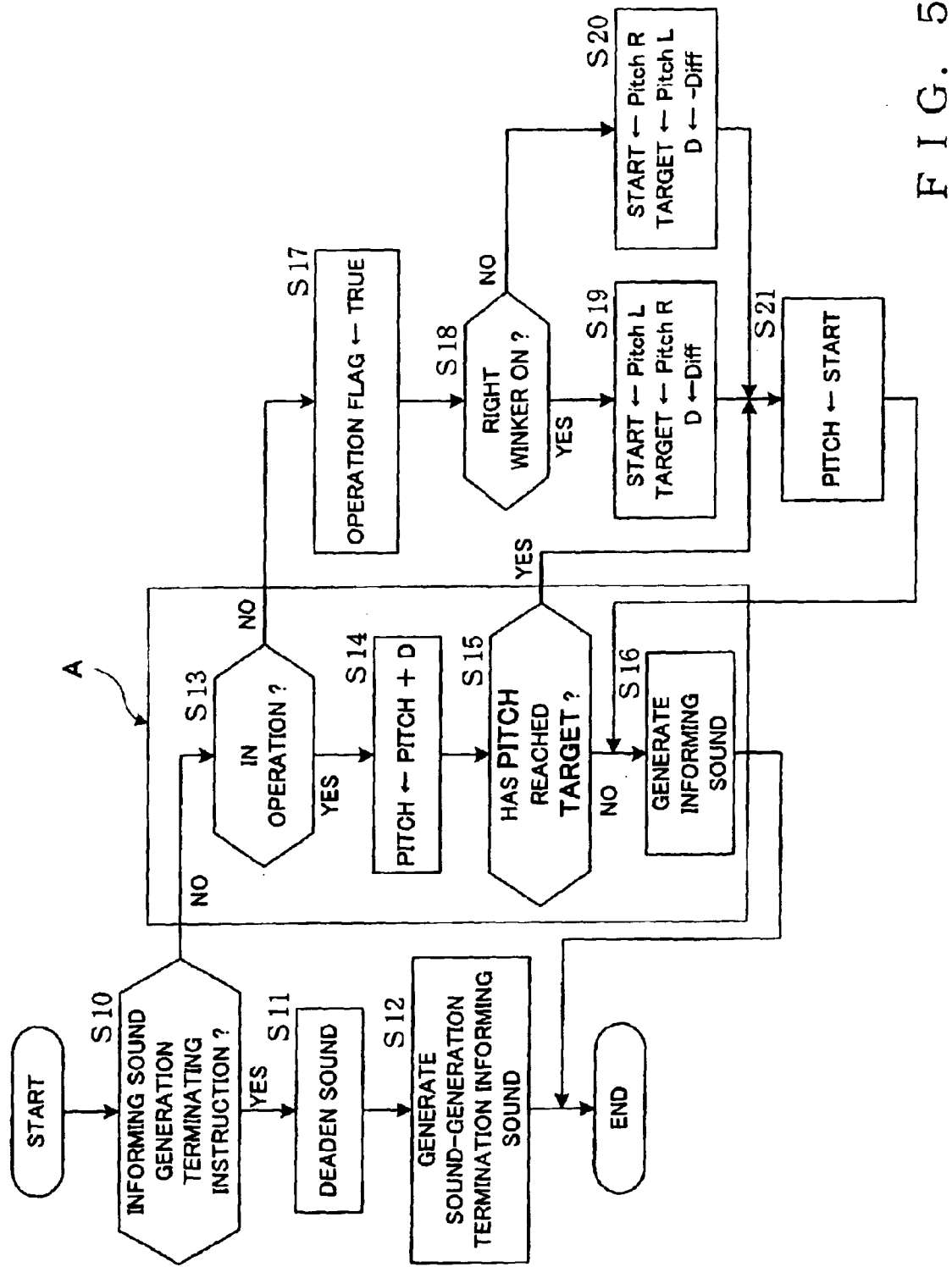
FIG. 5 is a flow chart of informing-sound generation control processing carried out by a sound generator device of the informing sound generation apparatus.

FIG. 5 is a flow chart of an example of informing-sound generation control processing carried out by the sound generator device 4.

The sound generator device 4 monitors instruction signals given from the control device 1 so that the device 4 can initiate the informing-sound generation control processing in response to each informing sound generation instruction from the control device 1. Specifically, each informing sound generation instruction or informing sound generation terminating instruction given from the control device 1 is stored in an instruction register. The sound generator device 4 monitors the instruction register every predetermined timing, so as to initiate the informing-sound generation control processing of FIG. 5 each time it is determined that the register has an informing sound generation instruction or informing sound generation terminating instruction stored therein. Once the informing-sound generation control processing is initiated, a determination is made at step S10 as to whether the instruction currently stored in the instruction register is an informing sound generation instruction or informing sound generation terminating instruction. If the instruction currently stored in the register is an informing sound generation terminating instruction, the damping process is performed at step S11 to deaden the informing sound having been generated so far. Then, at step S12, sound-generation termination informing sound is generated only once by the sounding mechanism 7 via the D/A converter 6. In this way, pedestrians and/or the like near the vehicle, having heard the sound-generation termination informing sound, can know that the right turn or left turn has been terminated; the sound-generation termination informing sound is generated only once.

If the instruction currently stored in the register is not an informing sound generation terminating instruction as determined at step S10, the processing branches to step S13 to determine whether the sound generator device 4 is currently generating informing sound. If the right-turn or left-turn informing sound is being generated by the sound generator device 4 and the right or left winker is currently in operation as determined at step S13, the processing proceeds to step S14 to update pitch information PITCH of the currently-generated informing sound. Specifically, at step S14, the current pitch information PITCH is updated by adding thereto a positive or negative pitch variation amount D. At next step S15, it is further determined whether or not the updated pitch PITCH has reached a target pitch TARGET. If the updated pitch PITCH has not yet reached the target pitch TARGET as determined at step S15, the processing moves on to step S16 to generate the informing sound of a pitch corresponding to the updated pitch information PITCH. If, on the other hand, the updated pitch PITCH has reached the target pitch TARGET as determined at step S15, the processing branches to step S21 to return the pitch of the informing sound to the start pitch.

If step S13 has determined that no informing sound is being generated and neither the right winker nor the left winker is currently in operation, it means that generation of right-turn or left turn informing sound is to be initiated now, the processing branches to step S17, where an operation flag is set to "TRUE". Then, a determination is made at step S18 as to whether or not the winker switch is currently in the right-winker actuating (right winker ON) position. If the winker switch is currently in the right-winker actuating position as determined at step S18, the processing moves to step S19, where the predefined lowest pitch PitchL is set as the start pitch, the predefined highest pitch PitchR is set as the target pitch and a positive variation value Diff is set as the pitch variation amount D. Although the variation value Diff may be an arbitrary value, it is, for example, set to a value obtained by subtracting the start pitch from the target pitch and dividing the subtracted result by a given integer. Then, the start pitch PitchL is set as the pitch information PITCH at step S21, after which the processing goes to step S16. At step S16, there is generated right-turn informing sound of the pitch PitchL. Upon completion of the operation at step S16, the informing-sound generation control processing is brought to an end; however, as long as the winker switch is kept in the right-winker actuating position, the informing-sound generation control processing is initiated again at next predetermined timing, because the right-turn informing sound generation instruction is still stored in the instruction register.

In this case, it is determined at step S13 that the right or left winker is currently in operation, and there is generated, at steps S14 to S16, right-turn informing sound with the pitch raised by the pitch variation amount D. With such operations repeated until a right-turn informing sound generation terminating instruction is given, there is generated right-turn informing sound starting with the pitch PitchL and progressively rising in pitch toward the target pitch PitchR. Further, when it is determined at step S15 that the pitch of the generated informing sound has reached the target pitch PitchR, the processing branches to step S21, so that the pitch PITCH of the informing sound is returned to the start pitch PitchL. In this way, the right-turn informing sound, varying from the start pitch PitchL to the target pitch PitchR, is generated repeatedly until a right-turn informing sound generation terminating instruction is given.

If the winker switch, on the other hand, is currently in the left-winker actuating (left winker ON) position as determined at step S18, the processing branches to step S20, where the predefined highest pitch PitchR is set as the start pitch, the predefined lowest pitch PitchL is set as the target pitch and a negative variation value −Diff is set as the pitch variation amount D. Then, the start pitch PitchR is set as the pitch information PITCH at step S21, after which the processing goes to step S16. At step S16, there is generated left-turn informing sound of the pitch PitchR. Upon completion of the operation at step S16, the informing-sound generation control processing is brought to an end; however, as long as the winker switch is in the left-winker actuating position, the informing-sound generation control processing is initiated again at next predetermined timing, because the left-turn informing sound generation instruction is still stored in the register.

In this case, it is determined at step S13 that the right or left winker is currently in operation, and there is generated, at steps S14 to S16, left-turn informing sound with the pitch lowered by the pitch variation amount D. With such operations repeated until a left-turn informing sound generation terminating instruction is given, there is generated left-turn informing sound starting with the pitch PitchR and progressively lowering in pitch toward the target pitch PitchL. Further, when it is determined at step S15 that the pitch of the generated informing sound has reached the target pitch PitchL, the processing branches to step S21, so that the pitch PITCH of the informing sound is returned to the start pitch PitchR. In this way, the left-turn informing sound, varying from the start pitch PitchR to the target pitch PitchL is generated repeatedly until a left-turn informing sound generation terminating instruction is given.

Figure 6:
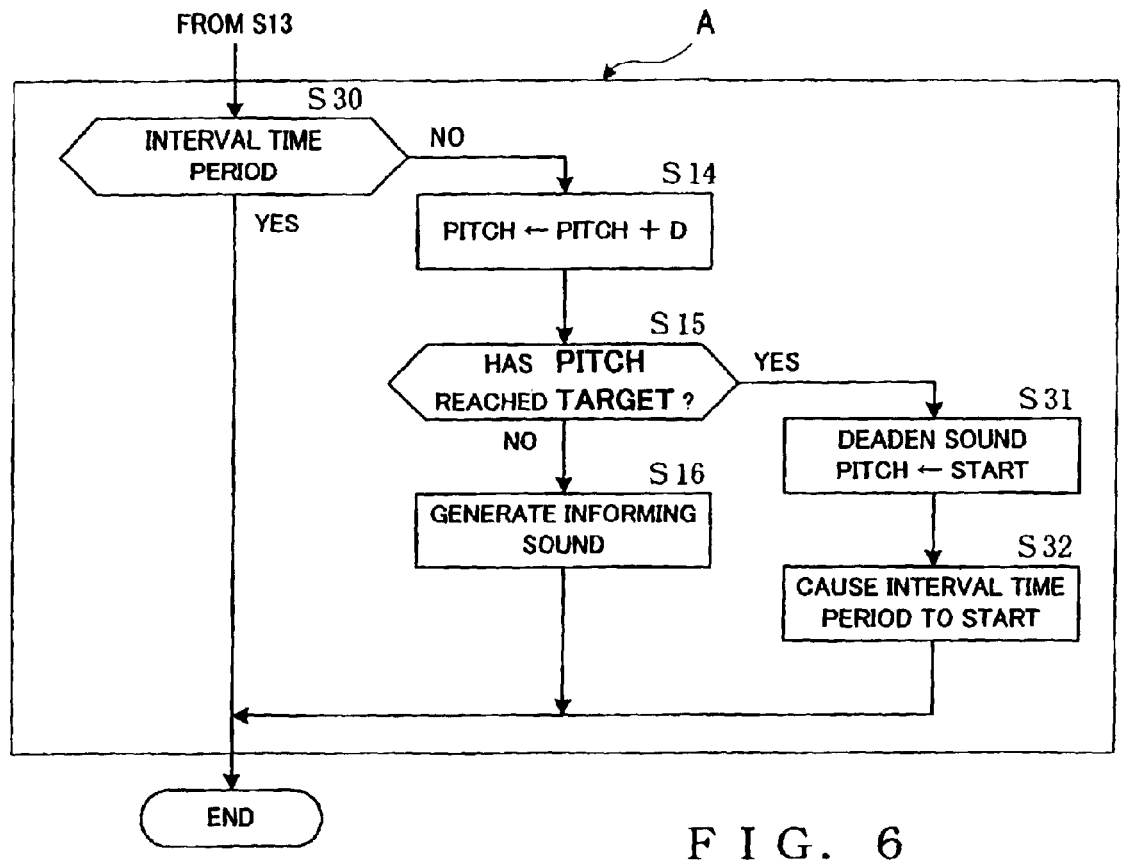
FIG. 6 is a flow chart of modified informing-sound generation control processing carried out by the sound generator device, where informing sound is generated with an interval time period inserted.
Figure 7:
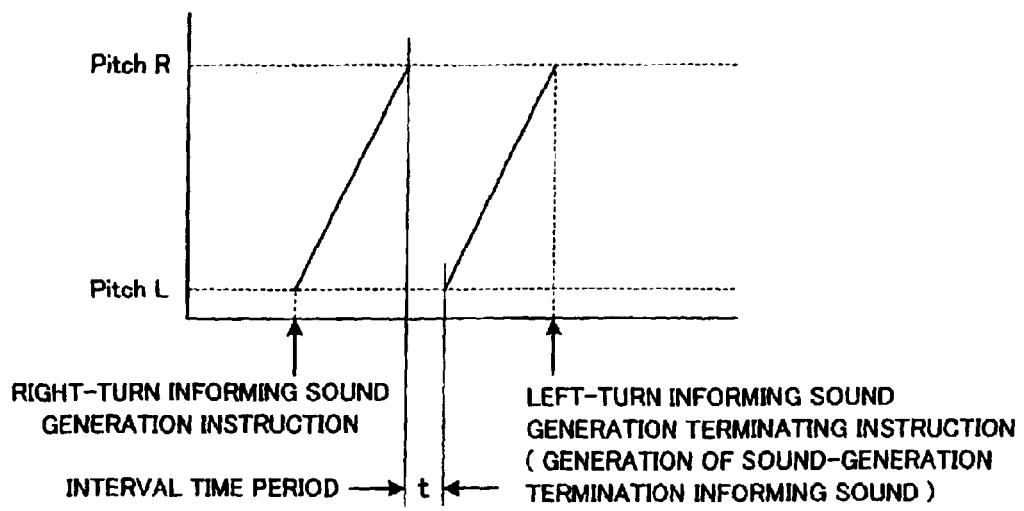
FIG. 7 is a diagram showing an example manner in which informing sound is generated with the interval time period inserted.

In an alternative, when the right-turn or left-turn informing sound has reached the target value, similar right-turn or left-turn informing sound, varying from the start pitch to the target pitch, may be generated upon lapse of a predetermined interval time period t, as illustrated in FIG. 7 in relation to the right-turn informing sound. Therefore, the following paragraphs describe a modified or second example of the informing-sound generation control processing, which is performed by the sound generator device 4 such that informing sound is generated with the interval time period inserted, with reference to FIG. 6. The second example of the informing-sound generation control processing is different from the informing-sound generation control processing of FIG. 5 only in terms of a flow portion A of FIG. 5, and thus the following paragraphs describe in detail the modified flow portion A with reference to FIG. 6 that shows only the modified flow portion A.

According to the second example of the informing-sound generation control processing, if it is determined at step S13 (FIG. 5) that the right or left winker is currently in operation, the processing goes to step S30, because the interval time period is inserted during generation of the right-turn or left-turn informing sound, i.e. while the right winker or left winker is in operation. At step S30, it is determined whether a current time falls within the interval time period. With an affirmative (YES) answer at step S30, the informing-sound generation control processing is brought to an end without executing any other operation. If, on the other hand, the current time does not fall within the interval time period, a negative (NO) determination is made at step S30, the processing branches to step S14. At steps S14 to S16, the same operations as described above in relation to FIG. 5 are carried out to generate right-turn informing sound varying from the start pitch PitchL to the target pitch PitchR or left-turn informing sound varying from the start pitch PitchR to the target pitch PitchL.

Once step S15 determines that the pitch of the generated informing sound has reached the target pitch, the processing branches from step S15 to step S31. At step S31, a damping process is performed on the informing sound, having been generated so far, to deaden the so-far-generated informing sound, and the pitch PITCH of the informing sound is returned to the start pitch. Then at step S32, the interval time period is caused to start. In this way, there can be inserted the interval time period t when the pitch of the generated informing sound has reached the target pitch. Upon completion of the operation at step S32, the informing-sound generation control processing is brought to an end.

Note that the interval time period is defined in terms of the number of loops or clock pulses. At step S32, counting of the interval time period is started, and an interval flag is set. Then, the interval flag is reset when a timer interrupt routine, counting process (not shown) or the like determines that the interval time period has elapsed. Namely, step S30 determines whether or not the current time falls within the interval time period, by checking the interval flag. The interval time period t may be of any suitable time length, and the time length may be increased or decreased each time the series of informing sound is repeated. In such a case, the interval time period t for the right-turn informing sound and the interval time period t for the left-turn informing sound may be caused to vary in opposite patterns.

Figure 8:
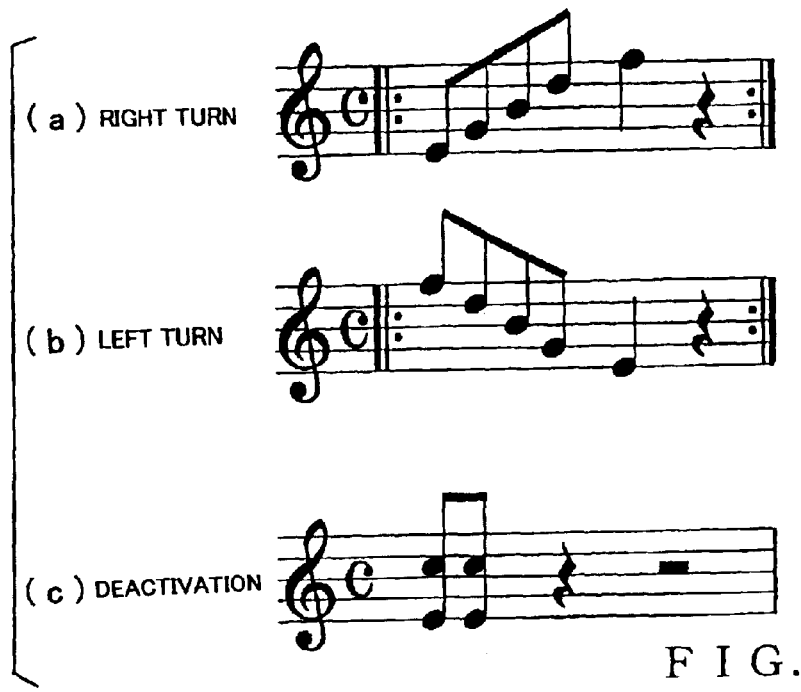
FIG. 8 is a diagram showing an example of a set of informing sound written on a musical staff.

It is preferable that the right-turn and left-turn informing sound be caused to vary musically. In this case, rules for varying a pitch, pitch interval, sound length (duration), etc. may be predefined so that the series of right-turn informing sound and the series of left-turn informing sound vary symmetrically to each other in pitch, pitch interval, sound length, etc., as illustratively shown in FIG. 8. Part (a) of FIG. 8 shows an example of right-turn informing sound written on a musical staff, in which case the pitch of the informing sound is caused to vary musically rather than varying with a fixed amount. Namely, in this case, the right-turn informing sound presents a progressively rising pitch variation pattern "E→G→B→D→F". Part (b) of FIG. 8 shows an example of left-turn informing sound written on a musical staff, in which case too the pitch of the informing sound is caused to vary musically. Namely, in this case, the left-turn informing sound presents a progressively lowering pitch variation pattern "F→D→B→G→E", and the left-turn informing sound presents a musical pitch pattern varying symmetrically to that presented by the right-turn informing sound. Further, part (c) of FIG. 8 shows an example of the sound-generation termination informing sound.

In the informing sound generation apparatus of the present invention, however, the informing sound may be set to vary over time in pitch in any other desired pattern than those illustrated in FIG. 8. Note that, in such a case too, the patterns of the right-turn and left-turn informing sound are set to present timewise variations symmetrical to each other.

Figure 9:
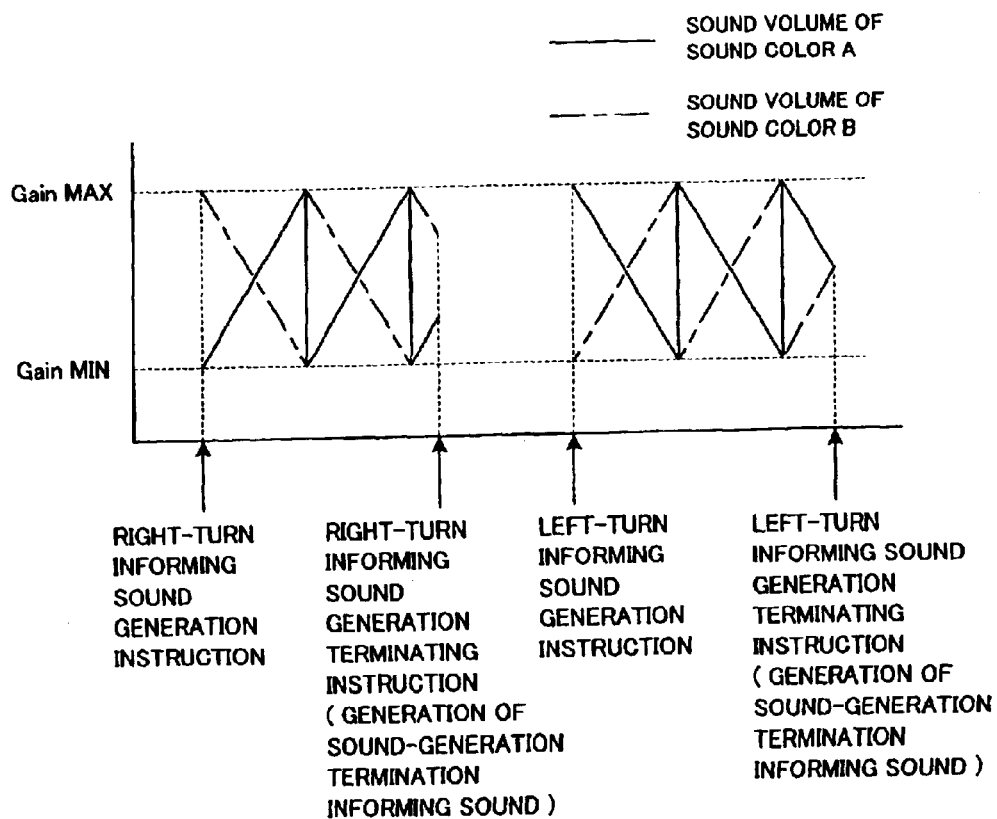
FIG. 9 is a diagram showing another example manner in which informing sound is generated by the informing sound generation apparatus.

Further, in the informing sound generation apparatus of the present invention, the right-turn and left-turn informing sound may be set to vary over time in sound color, instead of varying over time in pitch or pitch interval as in the example of FIG. 8. Namely, in an illustrated example of FIG. 9, the right-turn informing sound is set to vary progressively from sound color B to sound color A, while the left-turn informing sound is set to vary progressively from sound color A to sound color B. Such sound color variations can be effected by just progressively varying sound color parameters, such as filter coefficients and/or FM (Frequency Modulation) parameters, for use by the sound generator device 4. Namely, the variation from sound color A to sound color B is effected by crossfading from sound color waveform data of sound color A to sound color waveform data of sound color B, while the variation from sound color B to sound color A is effected by crossfading from the sound color waveform data of sound color B to the sound color waveform data of sound color A. In this case, a maximum sound volume predetermined for sound color A and B is set as a maximum gain GainMAX, and a minimum sound volume predetermined for sound color A and B is set as a minimum gain GainMIN.

Once a right-turn informing sound generation instruction is given, the maximum gain GainMAX is set as a start gain of sound color B and the minimum gain GainMIN is set as a target gain of sound color B, while the minimum gain GainMIN is set as a start gain of sound color A and the maximum gain GainMAX is set as a target gain of sound color A. Thus, the sound volume of sound color B is progressively turned down from the maximum gain GainMAX to the minimum gain GainMIN, while the sound volume of sound color A is progressively turned up from the minimum gain GainMIN to the maximum gain GainMAX. Once a left-turn informing sound generation instruction is given, on the other hand, the maximum gain GainMAX is set as the start gain of sound color A and the minimum gain GainMIN is set as the target gain of sound color A, while the minimum gain GainMIN is set as the start gain of sound color B and the maximum gain GainMAX is set as the target gain of sound color B. Thus, the sound volume of sound color A is progressively turned down from the maximum gain GainMAX to the minimum gain GainMIN, while the sound volume of sound color B is progressively turned up from the minimum gain GainMIN to the maximum gain GainMAX. Thus, pedestrians and/or the like, hearing either one of the series of the right-turn and left-turn informing sound varying in symmetrical relation to each other, can know, practically through intuition, a turning direction of the vehicle. Informing-sound generation control processing to be performed in this case can be flowcharted generally in a similar manner to the flow chart of FIG. 5, by just replacing the term "pitch" with the term "gain". Further, the winker-deactivation informing sound (sound-generation termination informing sound) can be differentiated in sound color from the right-turn and left-turn informing sound.

Furthermore, in the informing sound generation apparatus of the present invention, the characteristic of the informing sound, varying symmetrically for right and left turns of the vehicle, may be a sound volume or sound length (duration) without being limited to a sound pitch, interval time period and sound color. Where it is desired to make sound length (duration) variation, the right-turn informing sound is set to progressively increase in sound length while the left-turn informing sound is set to progressively decrease in sound length, so that the sound lengths of the right-turn and left-turn informing sound vary symmetrically for right and left turns of the vehicle. Where it is desired to make sound volume variation, arrangements similar those shown in FIG. 9 may be employed, in which case sound color A or B may be generated if a single sound color is selected for both the right-turn informing sound and the left-turn informing sound.

Furthermore, the selected characteristic of the informing sound may be varied in a non-linear fashion. If the sound color is to be varied in a cross-fade fashion, control may be performed such that every sound to be generated has a fixed sound pressure (power) or such that the sound is imparted with predetermined sound pressure variation.

Furthermore, the control to vary the selected characteristic of the informing sound may be performed by referring to a table defining characteristic variation or using results of arithmetic operations based on predetermined functions.

Further, arrangements may be made such that a desired sound color and/or variation rule can be selected from among a plurality of sound colors and/or variation rules, and the informing sound generation apparatus of the present invention may be constructed to be able to receive a desired sound color and/or variation rule of the informing sound from an external source. In this case, the informing sound generation apparatus of the invention may be provided with a storage medium so that the desired sound color and/or variation rule of the informing sound can be downloaded to the storage medium by way of a communication network. The storage medium may be any of a semiconductor storage device like a memory card, an optical disk, a storage medium storing information as optical variation patterns like barcodes, and a magnetic storage medium like a flexible or hard disk. Further, the communication network may be any of a bus like a USB (Universal Serial Bus) or IEEE1394, LAN (Local Area Network) like Ethernet (registered trademark), or wireless LAN like Bluetooth (registered trademark), etc.

Furthermore, music piece data in the MIDI format or the like may be stored as data indicative of the informing sound.

The preceding paragraphs have described the cases where a selected characteristic of the informing sound is varied under control of the sound generator device 4. In an alternative, there may be prestored two symmetrically-varying sets of informing sound data, such as PCM waveform data, so that informing sound can be generated by reproductively reading out the informing sound data in response to an activated direction of any one of the operators in the operator unit 3.

Further, whereas the preceding paragraphs have described the informing sound generated in response to activation of the direction indicating operator, the present invention is not so limited. For example, the present invention is also applicable to generation of informing sound in response to activation of any one of other vehicle-mounted devices capable of being operated in symmetrical or opposite directions, such as the steering wheel (clockwise and counterclockwise directions), accelerator pedal, brake pedal and clutch pedal (depressing and releasing directions), and speed shift device (upshift and downshift directions, or forward and rearward directions).

Further, whereas the informing-sound generation control processing of the present invention has been described above as performed by the CPU 4a of the sound generator device 4, the informing-sound generation control processing may be performed by the control device 1 that is mainly engaged in control of the behavior of the vehicle. In such a case, it is only necessary that the control device 1 output sound control signals, including informing sound generating/deadening instructions, to the sound generator device 4 so that the sound generator device 4 controls generation/deadening of the informing sound and a selected characteristic of the informing sound on the basis of the sound control signals given from the control device 1.

Furthermore, whereas the informing-sound generation control processing of the present invention has been described above as implemented by a software program executed by the control device 1 or CPU 4a, it may be implemented by logic circuitry capable of performing similar operations.

Furthermore, the basic principles of the present invention may be applied to other products than various vehicles capable of actually traveling on roads, such as tractors, toy vehicles, playing machines installed in game centers and the like, video game programs, etc. as long as they can travel in reality or virtually.

In summary, the present invention is characterized in that a characteristic of informing sound generated in response to activation, in opposite or symmetrical directions, of a vehicle-mounted operator is caused to vary in a symmetrical fashion. Thus, with such informing sound, the present invention can inform a pedestrian and/or the like about a vehicle driver's intention and a vehicle's traveling direction in such a manner that the pedestrian and/or the like can readily recognize the driver's intention and traveling direction practically through intuition. The present invention is also characterized in that informing sound is generated with a progressively rising pitch when the vehicle is turning right while informing sound is generated with a progressively lowering pitch when the vehicle is turning left. With this arrangement, the present invention can inform a pedestrian and/or the like about a vehicle driver's intention and a vehicle's traveling direction in such a manner that the pedestrian and/or the like can even more readily recognize the driver's intention and traveling direction through intuition.

The present invention relates to the subject matter of Japanese Patent Application No. 2002-165274, filed on Jun. 6, 2002, the disclosure of which is expressly incorporated herein by reference in its entirety.

What is claimed is:

1. An informing sound generation method for generating informing sound in response to activation of a vehicular operator device capable of being activated in at least two directions, said informing sound generation method comprising:

a step of, in response to activation, in a first direction, of said operator device, generating informing sound varying over time with a first characteristic; and a step of, in response to activation, in a second direction, of said operator device, generating informing sound varying over time with a second characteristic generally opposite to said first characteristic, wherein said first characteristic and said second characteristic cause the generated informing sound to repeat progressive variation, per predetermined time, from an initial value to a target value.

2. An informing sound generation method as claimed in claim 1 wherein said first characteristic and said second characteristic are different in symmetrical relation to each other.

3. An informing sound generation method as claimed in claim 1 wherein any one of or a combination of any two or more of a sound pitch, color, volume and duration of the informing sound varies over time.

4. An informing sound generation method as claimed in claim 1 wherein said operator device is any one of a direction indicating operator, steering wheel, accelerator pedal, brake pedal and speed change lever of a vehicle.

5. An informing sound generation method as claimed in claim 1 wherein said operator device is used in an actual or virtual vehicle.

6. An informing sound generation method as claimed in claim 1 which further comprises a step of detecting when said operator device has been activated in said first or second direction.

7. An informing sound generation method as claimed in claim 1 wherein the initial value of said first characteristic is equal to the target value of said second characteristic, while the target value of said first characteristic is equal to the initial value of said second characteristic.

8. A computer program on a computer readable medium for causing the computer to perform an informing sound generation method for generating informing sound in response to activation of a vehicular operator device capable of being activated in at least two directions, said informing sound generation method comprising:

a step of, in response to activation, in a first direction, of said operator device, generating informing sound varying over time with a first characteristic; and a step of, in response to activation, in a second direction, of said operator device, generating informing sound varying over time with a second characteristic generally opposite to said first characteristic, wherein said first characteristic and said second characteristic cause the generated informing sound to repeat progressive variation, per predetermined time, from an initial value to a target value.

9. An informing sound generation apparatus for generating informing sound in response to activation of a vehicular operator device capable of being activated in at least two directions, said informing sound generation apparatus comprising:

a control device that controls a sound generator, in response to activation, in a first direction, of said operator device, to generate informing sound varying over time with a first characteristic, wherein said control device further controls said sound generator, in response to activation, in a second direction, of said operator device, to generate informing sound varying over time with a second characteristic generally opposite to said first characteristic, wherein said first characteristic and said second characteristic cause the generated informing sound to repeat progressive variation, per predetermined time, from an initial value to a target value.

10. An informing sound generation apparatus as claimed in claim 9 wherein said first characteristic and said second characteristic are different in symmetrical relation to each other.

11. An informing sound generation apparatus as claimed in claim 9 wherein any one of or a combination of any two or more of a sound pitch, color, volume and length of the informing sound varies over time.

12. An informing sound generation apparatus as claimed in claim 9 wherein said operator device is any one of a direction indicating operator, steering wheel, accelerator pedal, brake pedal and speed change lever of a vehicle.

13. An informing sound generation apparatus as claimed in claim 9 wherein said operator device is used in an actual or virtual vehicle.

14. An informing sound generation apparatus as claimed in claim 9 which further comprises a detector that detects when said operator device has been activated in said first or second direction.

15. An informing sound generation apparatus for generating informing sound in response to activation of a direction indicating operator of a vehicle, and said direction indicating operator capable of being selectively activated in one of a right direction indicating a right turn of the vehicle and a left direction indicating a left turn of the vehicle, said informing sound generation apparatus comprising:

a control device that controls a sound generator, in response to activation, in the right direction of said direction indicating operator, to generate informing sound varying over time with a first characteristic, said first characteristic being a characteristic to cause the generated informing sound to repeat, per predetermined time, progressive increase from a given initial value to a target value, wherein said control device further controls said sound generator, in response to activation, in the left direction, of said direction indicating operator, to generate informing sound varying over time with a second characteristic, said second characteristic being a characteristic to cause the generated informing sound to repeat, per predetermined time, progressive decrease from a given initial value to a target value.

* * * * *